(12) United States Patent
Wong et al.

(10) Patent No.: US 7,732,122 B2
(45) Date of Patent: Jun. 8, 2010

(54) METHOD FOR PRODUCING PHOTONIC CRYSTALS

(75) Inventors: Sean H. Wong, Toronto (CA); Georg Ludwig Eberhard von Freymann, Karlsruhe (DE); Geoffrey A. Ozin, Toronto (CA); Markus Deubel, Schweighofen (DE); Martin Wegener, Karlsruhe (DE)

(73) Assignees: Forschungszentrum Karlsruhe GmbH, Karlsruhe (DE); University of Toronto, Toronto, Ontario (CA)

( * ) Notice: Subject to any disclaimer, the term of this patent is extended or adjusted under 35 U.S.C. 154(b) by 526 days.

(21) Appl. No.: 11/659,432

(22) PCT Filed: Aug. 5, 2005

(86) PCT No.: PCT/EP2005/054231

§ 371 (c)(1),
(2), (4) Date: May 29, 2007

(87) PCT Pub. No.: WO2006/015989

PCT Pub. Date: Feb. 16, 2006

(65) Prior Publication Data

US 2008/0032237 A1    Feb. 7, 2008

(30) Foreign Application Priority Data

Aug. 5, 2004   (DE) .................. 10 2004 037 949

(51) Int. Cl.
*G02B 6/122* (2006.01)
(52) U.S. Cl. ...................................... 430/321
(58) Field of Classification Search .............. None
See application file for complete search history.

(56) References Cited

U.S. PATENT DOCUMENTS 4,493,886 A   1/1985   Lauks et al.

(Continued)

FOREIGN PATENT DOCUMENTS

WO   2005/062091   7/2005

(Continued)

OTHER PUBLICATIONS

H. Misawa et al: Laser Microfabrication/Manipulation of Dielectric . . . , IEEE Proceedings of 2000 Int. Symposium, ISBN 0-7803-6498-8, pp. 23-33.

(Continued)

*Primary Examiner*—John A. McPherson
(74) *Attorney, Agent, or Firm*—Friedrich Kueffner

(57) ABSTRACT

The invention relates to a process for producing photonic crystals by first providing an inorganic photoresist which, on illumination with energy greater than the electronic band gap of the photoresist, exhibits a phase alteration. Illumination of the photoresist with a laser beam whose energy is lower than the electronic band gap of the photoresist but whose intensity at the focal point is so high that nonlinear effects occur there nevertheless results in a phase alteration in the photoresist. Thereafter, the illuminated photoresist is exposed to an etching solution which preferentially dissolves one phase of the photoresist, and the developed photoresist is finally removed therefrom as a photonic crystal. Inorganic photonic crystals produced by the process according to the invention are suitable for completely optical systems, circuits and components for optical telecommunication or computer systems.

8 Claims, 1 Drawing Sheet

U.S. PATENT DOCUMENTS

Figure 1:
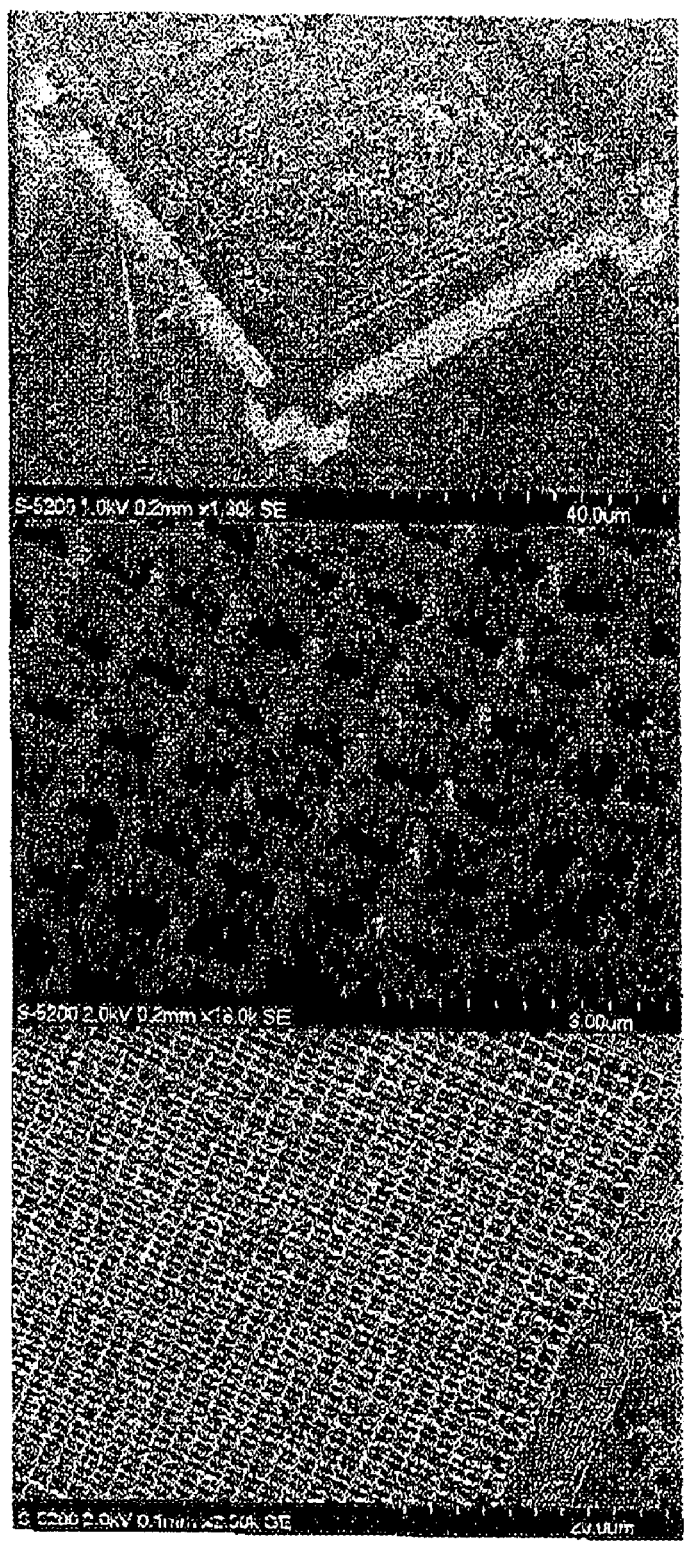

2005/0124712 A1* 6/2005 Anderson et al. ............... 522/1
2005/0193771 A1* 9/2005 Miura et al. ................. 65/33.2

FOREIGN PATENT DOCUMENTS

WO 2005/066672 7/2005

OTHER PUBLICATIONS

S. Juodkazis et al: Formation of Embedded Patterns in Glasses . . . , Applied Physics A 79, pp. 1549-1553.

J. Serbin et al: Three-Dimensional Photonic Nanostructures Fabricated . . . IEEE Proceedings of Conference on Lasers, ISBN 0-7803-7734-6, p. 658.

E. Yablonovitch, Phys. Rev. Lett., vol. 58, p. 2059-2062, 1987, and S. John, IBID., p. 2486-2489, 1987.

J.G. Fleming and S.Y. Lin, Three—Dimensional Photonic Crystal With a Stop Band From 1.35 to 1.95 μM, Optics Letters, vol. 24, pp. 49-51, 1999.

S. Kawata, H.B. Sun, T. Tanaka and K. Takeda, Finer Features for Functional Microdevices, Nature, vol. 412, p. 697, 2001.

K. Richardson et al., Direct Femtosecond Laser Writing of Waveguides in $AS_2S_3$ Thin Films, Optics Letters, vol. 29, p. 748-750, Apr. 2004.

A.P. Aleksandrov et al, Formation of Microstructures in . . . , Quantum Electronics, vol. 31, pp. 398-400, 2001.

Cheng et al: "3D Microstructuring Inside Forturan Glass by . . . "; No. 50, Jan. 2003, pp. 101-106, XP002972175.

C. Meneghini, "AS2S3 Photosensitivity by Two-Photon Absorption . . . ", vol. 15, No. 12, Dec. 1998, pp. 2946-2950, XP002361412.

M. Deubel, "Direct Laser Writing of Three-Dimensional Photonic-Crystal", vol. 3, Jun. 13, 2004, pp. 444-447, XP 002361413.

Cheng et al, "Optical Gratings Embedded in Photosensitive Glass by . . . ", vol. 11, No. 15, Jul. 28, 2003, p. 1809-1816, XP002361414.

Feigel, et al: "Three-Dimensional Simple Cubic Woodpile Photonic . . . ", vol. 83, No. 22, Dec. 1, 2003, pp. 4480-4482, XP002361415.

Zoubir, et al: "Direct Femtosecond Laser Writing of Waveguides in . . . ", vol. 29, No. 7, Apr. 1, 2004, pp. 748-750, XP002361416.

Kawata et al: "Finer Features for Functional Microdevices", vol. 412, Aug. 16, 2001, pp. 697-698, XP 002361417.

\* cited by examiner

METHOD FOR PRODUCING PHOTONIC CRYSTALS

This application claims the priority of DE 10 2004 037 949.1.

The invention relates to a process for producing photonic crystals.

E. Yablonovitch, Phys. Rev. Lett., Volume 58, page 2059-2062, 1987, and S. John, ibid., page 2486-2489, 1987, independently derived the conditions that a three-dimensional photonic crystal has to meet in order to have a complete photonic band gap. Since then, attempts have been made to actually produce three-dimensional photonic crystals from a suitable material either top-down by microstructuring, bottom-up by self-organization or by combination of the two processes. However, the lattice constants of such crystals have to be comparable with the wavelength of light and consist of a material with high refractive index, i.e. above approx. n=2.

A known photonic lattice structure with a three-dimensional photonic band gap composed of a material with high refractive index is the so-called woodpile or Lincoln Log structure. A process for producing such a structure consists in the stacking of a row of dielectric rods on another row of dielectric rods, each row being arranged at right angles to the preceding row and simultaneously being shifted by a half period.

By layer-by-layer processing of a silicon semiconductor, J. G. Fleming and S. Y. Lin, Three-dimensional photonic crystal with a stop band from 1.35 to 1.95 µm, Optics Letters, Volume 24, page 49-51, 1999, provided the first woodpile with complete photonic band gap for the near infrared. B. Sfez and V. Lyubin, Three-dimensional simple cubic woodpile photonic crystals made from chalcogenide glasses, Appl. Phys. Lett., Volume 83, page 4480-4482, 2003, likewise provided the same structure by means of layer-by-layer holographic structuring and etching of a chalcogenide semiconductor.

In order to avoid layer-by-layer production, S. Kawata, H. B. Sun, T. Tanaka and K. Takeda, Finer features for functional microdevices, Nature, Volume 412, page 697, 2001, developed direct laser writing for woodpile structures in polymeric photoresists. They polymerized selected regions of the photoresist which were at the focal point of the laser beam. The focal point was scanned in all three three-dimensional directions in order to write the lattice structures of the desired photonic crystal. Owing to the low dielectric contrast of the polymeric resist, it is not possible to use it to produce structures directly with complete three-dimensional band gap.

C. Meneghini and A. Villeneuve proposed, in $As_2S_3$ photosensitivity by two-photon absorption: Holographic gratings and self written channel waveguides, Journal of the Optical Society of America B, Volume 15, page 2946-2950, 1998, the production of a continuous two-dimensional waveguide in the interior of a heat-treated chalcogenide resist by means of laser-induced refractive index modulation. Refractive index modulation occurs via photoinduced structural alterations which are caused by two-photon processes which begin at the surface of the chalcogenide resist. It has been found experimentally that laser pulses which have been introduced through an optical fiber into the chalcogenide resist alter the refractive index in the illuminated regions. By means of self-focusing effects, a waveguide was thus written into the chalcogenide resist. However, this process is restricted to linear two-dimensional structures which are written into the chalcogenide resist parallel to the optical fiber axis.

K. Richardson et al., Direct femtosecond laser writing of waveguides in $As_2S_3$ thin films, Optics Letters, Volume 29, page 748-750, April 2004, showed the production of two-dimensional Y-couplers in a chalcogenide film by means of direct laser writing with a femtosecond laser beam. Excited by the laser pulse, the chalcogenide experienced a photoinduced structural alteration which brought about an increase in the refractive index in the regions written. However, the functional two-dimensional structure thus produced was not etched out but rather acted merely on the basis of the refractive index difference between written and unwritten regions within the chalcogenide glass.

A. P. Aleksandrov et al., Formation of microstructures in $As_2S_3$ by a femtosecond laser pulse train, Quantum Electronics, Volume 31, page 398-400, 2001, proposed the use of a two-photon process system for a photothermally induced phase transition in a chalcogenide. If the chalcogenide absorbs intense laser pulses, a change in the refractive index caused by thermally induced stress birefringence occurs, refractive index structures in the order of magnitude of micrometers being formed. The resulting structure in the chalcogenide was not etched out.

According to C. Meneghini et al. (see above), a chalcogenide is affected by a reversible or irreversible photoinduced structural phase alteration, but a reversible phase alteration can be reversed by means of a subsequent treatment of the chalcogenide. For example, structures introduced in a heat-treated chalcogenide glass can be erased by thermal treatment which relaxes the unordered structures written into the material.

For the irreversible process, the desired phase of the chalcogenide photoresist is formed by means of thermal evaporation. When, for example, an $As_2S_3$ chalcogenide glass is used as the precursor substance, thermal evaporation brings about the formation of $As_4S_4$ molecules in the gas phase, which are subsequently deposited onto the substrate. With illumination with suitable radiation, the bonds in the $As_4S_4$ molecules become reordered in order to form $As_2S_3$ chalcogenide again. This photon-controlled process is irreversible, since the $As_2S_3$ chalcogenide cannot be converted back to molecular $As_4S_4$ molecules without destroying the structure beforehand. However, irreversible thin chalcogenide films produced in this way exhibit properties which differ from directly written $As_2S_3$ chalcogenide, especially a blue shift in the band gap of the evaporated material in comparison to the original material, and also different crystal structures and chemical activities.

Proceeding therefrom, it is an object of the present invention to propose a process for producing photonic crystals which does not have the disadvantages and restrictions mentioned. In particular, this process should enable the production of three-dimensional photonic crystals in an inorganic photoresist.

This object is achieved by the features of claim 1. The subclaims each describe advantageous embodiments of the invention.

The present invention relates to a process for the direct laser writing of a multitude of structures of different size and spatial dimensions in an inorganic material, which is referred to as an inorganic photoresist, the structures being obtained by means of controlled movement of the focal point of a focused laser beam on its path within the inorganic material. The invention is based on a photon-induced alteration of the phase at the focal point of the laser beam without influencing the remaining material, and which are subsequently subjected to an etching process which is selective in relation to the phase, in order thus to disclose the structures formed in the inorganic material.

The process according to the invention consists in particular in the production of three-dimensional structures, preferably of three-dimensional photonic crystals, by multiphoton laser writing, especially two-photon laser writing, or by multiphoton laser holography, especially two-photon laser holography, in an inorganic photoresist, preferably in an irreversible chalcogenide photoresist, and subsequent etching-out of the unilluminated structures.

To perform the process according to the invention, an inorganic photoresist is first provided in process step a). A crucial factor in the selection of the material is its property of exhibiting a phase alteration on illumination with energies above the electronic band gap. Preference is given to using an inorganic material whose refractive index has a value of at least 1.4.

A chalcogenide glass is preferably used as the inorganic photoresist. A chalcogen is a chemical element from main group VI of the periodic table, which include in particular sulfur, selenium and tellurium. Suitable chalcogenides for the process according to the invention are the following:

Binary chalcogenides: arsenic sulfide, arsenic selenide and arsenic telluride, the chalcogenides of silicon, tin, antimony, phosphorus, germanium, thallium and halogen.

Tertiary chalcogenides: the chalcogenides of phosphorus-arsenic, silver-arsenic, phosphorus-antimony and phosphorus-tin Multinary chalcogenides: sodium-germanium-arsenic selenide and copper-germanium-silicon telluride.

Particular preference is given to the two binary chalcogenides arsenic sulfide and arsenic selenide.

Inorganic photoresists, for example chalcogenide glasses, are notable in that their structure changes under illumination with light of suitable wavelength (energy). Accordingly, in process step b), the photoresist provided is irradiated with a laser beam whose energy at the selected wavelength is below the electronic band gap of the photoresist. However, the intensity at the focal point is selected such that a local phase alteration in the photoresist nevertheless occurs via a nonlinear process (multiphoton process). The simultaneously existing transparency of the chalcogenide glasses for frequencies below the electronic band gap ensures that the light required for multiphoton processes also actually penetrates into the interior of the material without being absorbed by one-photon processes. Multiphoton processes can be obtained with intense laser pulses or alternatively with a continuous high-intensity laser beam.

Instead of a laser beam, any other energy beam which brings about structural changes in chalcogenide photoresists is in principle suitable for this purpose. Since, however, most photoresists, including chalcogenide photoresists, are not transparent with respect to electron or ion beams, there is only a limited penetration depth for this purpose, as a result of which three-dimensional structures with high aspect ratio cannot be written into the material. Such beams are therefore suitable only for the writing of two-dimensional structures.

In process step c), the laser beam and the photoresist or the substrate on which the photoresist is disposed are moved with respect to one another until the desired structure has been written into the material after several repetitions of process step b).

Subsequently, the illuminated photoresist is developed in process step d) in an etching solution which, owing to the structural and chemical differences between the illuminated and the unilluminated phase, dissolves one of the two phases of the photoresist selectively. The etching solution preferably comprises an organic Lewis base, more preferably diethylamine, isoamylamine, benzylamine or propylamine. The chalcogenide photoresist behaves like a negative photoresist, since the illuminated regions are leached out with a significantly slower rate in comparison to the unilluminated regions. Structurally changed chalcogenide photoresists, for example composed of arsenic sulfide or arsenic selenide, exhibit a high etch contrast which is preferably above 1:10, more preferably above 1:100, more preferably above 1:500, and have a high refractive index, preferably above 2.

Finally, in process step e), the developed photoresist is removed as the photonic crystal which exhibits a photonic stop band or a complete photonic band gap in its photonic state density. The process according to the invention allows not only the production of three-dimensional woodpile structures; instead, each structure can thus be produced with a length scale in the range from nanometers up to micrometers in one, two or three dimensions, which has mutually connected lattices of illuminated and unilluminated regions including functional defect sites, for example point defects, lines or bands.

Inorganic photonic crystals produced by the process according to the invention are suitable for all-optic systems, circuits and components for optical telecommunications or optical computer systems.

The invention will be illustrated in detail hereinafter with reference to a working example and the FIGURE.

FIG. 1 shows a scanning electron micrograph of an etched 3D woodpile structure which has been produced by means of direct laser writing in arsenic sulfide $As_2S_3$.

1. PROVISION OF A FILM COMPOSED OF A CHALCOGENIDE PHOTORESIST ON A SUBSTRATE

The first step consisted in the application of the chalcogenide arsenic sulfide $As_2S_3$ to an optically transparent silicate glass with the dimensions of 22 mm×22 mm×170 μm as the substrate. Solid arsenic sulfide was first ground to fine powder and then introduced into a heating element coated with aluminum oxide in a thermal evaporation chamber. A substrate holder was used in order to keep the glass substrate in place. After closure, the chamber was evacuated to a pressure of $3 \cdot 10^{-5}$ Pa ($2 \cdot 10^{-7}$ Torr). The aluminum oxide crucible was heated to 230-280° C., in the course of which the pulverulent chalcogenide sublimed and was precipitated on the glass substrate in the form of a thin film having a thickness between 5-μm. This process step took a total of 10-20 minutes.

2. DIRECT LASER WRITING OF A THREE-DIMENSIONAL PHOTONIC CRYSTAL STRUCTURE INTO THE CHALCOGENIDE PHOTORESIST

The chalcogenide photoresist thus produced was introduced in a setup for two-photon laser writing. In order to write a 3D photonic crystal structure into this film, a regeneratively amplified Ti:sapphire laser with a pulse duration of 120 fs was used, whose repeat rate was adjusted between 1 kHz and single pulse. The wavelength selected was 800 nm, since the single-photon absorption rate of the chalcogenide is negligible within this range.

The laser beam was attenuated by a combination of half-wave plate and polarizer, so that a few tenths of an nJ of single-pulse energy were introduced into an inverse microscope. There, the fs pulses were focused into the chalcogenide photoresist by means of a 100× oil immersion lens with high numerical aperture (NA=1.4). The sample was disposed on a capacitance-controlled piezoscanner which had a resolution below 5 nm in an operational field of 200 μm×200 μm×20 μm. A computer controlled the scanning and synchronized this movement with the output of the laser system.

The high intensity thus achieved at the focal point enabled a two-photon absorption process. The shape of the illuminated volume was an ellipsoid with a ratio of the axial to the lateral diameter of approx. 6. With this setup, lateral dimensions down to 200 nm have to date been obtainable. The volume in the focal point of the laser was kept constant, while the substrate on which the photoresist was disposed was moved along the x, y or z axis. Even now, the structure written with the laser was recognizable in the chalcogenide photoresist.

3. ETCHING OF THE WRITTEN CHALCOGENIDE PHOTORESIST

The photoresist thus written was now exposed to a liquid etching agent, i.e. an organic solvent which comprised a reactive organic Lewis base, especially an organic amine, for example diethylamine. Owing to the chemical sensitivity of the etching agent, as in a negative photoresist, the illuminated regions were etched very much more slowly in comparison to the unilluminated regions of the chalcogenide photoresist. The etching took approx. 10-20 minutes. The ratio of the etching rates between illuminated and unilluminated regions was greater than or equal to 500:1. Subsequently, the photonic crystal was removed from the etching agent, cleaned in an organic solvent, for example 1,2-dichloromethane, and dried under standard conditions. FIG. 1 shows a scanning electron micrograph of an etched three-dimensional photonic woodpile crystal structure which has been obtained by means of direct laser writing into arsenic sulfide $As_2S_3$.

The invention claimed is:

1. A process for producing three-dimensional photonic crystals, comprising the process steps of
   a) providing an inorganic photoresist which, on illumination with energy which is greater than the electronic band gap of the photoresist, exhibits a phase alteration,
   b) illuminating the photoresist with a laser beam whose energy is lower than the electronic band gap of the photoresist, but whose intensity at the focal point is so high that nonlinear effects occur there, as a result of which a phase alteration occurs in the photoresist, wherein the photoresist which consists of a binary, ternary or multinary compound which comprises an element of main group VI of the periodic table,
   c) repeatedly moving the laser beam and the photoresist relative to one another and repeating process step b),
   d) developing the illuminated photoresist in an etching solution which preferably dissolves one phase of the photoresist,
   e) removing the developed photoresist as a photonic crystal; wherein the non-linear effects recited in step (b) are multiphotonic processes and; wherein
the etching solution comprises an organic Lewisbase.

2. The process as claimed in claim 1, comprising a photoresist which has a refractive index of at least 1.4.

3. The process as claimed in claim 1, comprising a photoresist consisting of a compound of sulfur, selenium or tellurium with arsenic, phosphorus, antimony, silicon, germanium or tin.

4. The process as claimed in claim 3, comprising a photoresist composed of arsenic sulfide or arsenic selenide.

5. The process as claimed in claim 1, having a wavelength of the laser radiation between 450 nm and 5000 nm.

6. The process as claimed in claim 1, wherein the ratio of the reaction rate of the etching solution in the illuminated regions to the reaction rate of the etching solution in the unilluminated regions is at least 1:10.

7. The process as claimed in claim 6, wherein the ratio of the reaction rate of the etching solution in the illuminated regions to the reaction rate of the etching solution in the unilluminated regions is at least 1:100.

8. The process as claimed in claim 1, comprising an etching solution which comprises diethylamine, isoamylamine, benzylamine or propylamine.

* * * * *